United States Patent [19]

Hughes et al.

[11] Patent Number: 5,048,363
[45] Date of Patent: Sep. 17, 1991

[54] WORM GEAR LUBRICATION RETAINER AND TRANSFER APPARATUS

[75] Inventors: Frederick R. Hughes, Kernersville, N.C.; Carlton L. Rintz, Lititz, Pa.; Ronald G. Sergeant, Lewisville; Karl E. Zemlin, Greensboro, both of N.C.

[73] Assignee: Burle Technologies, Inc., Wilmington, Del.

[21] Appl. No.: 577,889

[22] Filed: Sep. 5, 1990

[51] Int. Cl.⁵ ........................ F16H 57/04; F16N 7/12
[52] U.S. Cl. ........................................ 74/467; 184/64; 74/425
[58] Field of Search ............... 74/467, 468, 425; 184/64

[56] References Cited

U.S. PATENT DOCUMENTS

| | | | |
|---|---|---|---|
| 320,395 | 6/1885 | Postawka | 74/467 |
| 2,062,070 | 11/1936 | Redmond | 74/467 |
| 2,675,098 | 4/1954 | Cole | 74/467 |
| 3,719,254 | 3/1973 | Snider | 74/468 X |

Primary Examiner—Allan D. Herrmann
Assistant Examiner—David W. Laub
Attorney, Agent, or Firm—Martin Fruitman

[57] ABSTRACT

A lubrication retainer and distribution system for a worm gear and the mating worm. Porous pads saturated with lubricating fluid are attached to both sides of the worm gear and located so that they spread slightly and wipe the high ridges of the worm. To equalize the fluid distribution between the pads, at least one through hole is formed in the worm gear between the pads, and the hole's size is selected so that capillary action transfers the fluid between the pads as required. Also, to retain the lubricating fluid on the worm, "O" rings are fitted tightly upon the worm shaft just beyond the spiral thread of the worm to act as barriers to prevent fluid from escaping from the system along the worm shaft.

6 Claims, 2 Drawing Sheets

WORM GEAR LUBRICATION RETAINER AND TRANSFER APPARATUS

SUMMARY OF THE INVENTION

This patent deals generally with machine elements, and more specifically with the lubrication of gears.

It is now well established that one means of lubricating worm gears and the worm, the spiral gear that drives a worm gear, is to attach one or more porous pads to the sides of the worm gear and to impregnate the pads with lubricating fluid. Typically, the radii of the pads extend to the region of the tops of the teeth of the worm gear, and the edges of the pads touch the upper portions of the spiral of the worm. The pads therefore constantly wipe the worm and supply it with lubricating fluid, while the fluid flows generally from the tops of the worm's screw into the valleys of the screw and onto the mating teeth of the worm gear. Such a lubricating system is shown in U.S. Pat. No. 2,675,098 by R. S. Cole.

There are, however, problems with that system of lubrication which are not acknowledged in Cole's patent, and which may, in fact, not always affect such a mechanism.

One such problem arises when the porous pad type of lubricating system is subjected to extremes of temperatures. In that circumstance, multi-viscosity lubricants are required, and under some circumstances these have low enough viscosity to flow so freely along the worm threads that the fluid is, in effect, pumped off the end of the worm and onto the shaft of the worm where it accumulates until dropping off. In a device which is also subjected to multiple positions, including being inverted, this can cause considerable difficulty, since unwanted fluid becomes dispersed throughout the entire device, and has the potential of damaging other parts which may not tolerate exposure to the lubricating fluid.

Another problem may exist to some extent in all porous pad lubricating systems, but is also more severe with some specific lubricants. That is the tendency for the lubricant to be wiped from one pad of a two pad set and onto the other by the rotation of the worm. Depending upon the direction of rotation and the position and shape of the pads as they touch the worm, it is possible for one pad to become saturated with lubricant while the other tends to dry out.

The present invention overcomes both these problems in the basic porous pad lubricating system and does so with simple, easily installed and inexpensive additions to the apparatus.

In order to stop the loss of lubricant onto the shaft of the worm, barriers are formed on the shaft of the worm just beyond the ends of the spiral thread. These barriers must, however, be constructed so that the lubricant will not merely travel over them and continue to be pumped off of the screw thread. One such barrier is a simple "O" ring positioned on the shaft and sealed tightly around it. The circular cross section of the "O" ring where it touches the shaft produces a barrier sufficient to counteract the surface tension of the lubricant as designated by section line 2—2 on FIG. 1, and it prevents the flow of lubricant over the "O" ring and onto the shaft beyond it.

The second problem of uneven distribution of lubricant between the two pads on opposite sides of the worm gear is counteracted by furnishing a capillary pumping mechanism between the two pads. This can be done by including one or more small cross section holes through the worm gear interconnecting the porous pads. In the preferred embodiment, these capillary pumping holes are provided by simply using bolts in through holes to hold washers which clamp the pads onto the worm gear, and sizing the holes so that they provide clearance for the bolts. It is the clearance space which acts as the capillary channel.

The problems of using the porous pad lubricating technique in extreme temperatures and in systems with unpredictable orientation can therefore be overcome quite simply by installing a tightly fitted "O" ring over the shaft on each end of the worm, and by clamping the porous pads onto the worm gear with standard bolts located in through clearance holes.

DETAILED DESCRIPTION OF THE INVENTION

Figure 1:
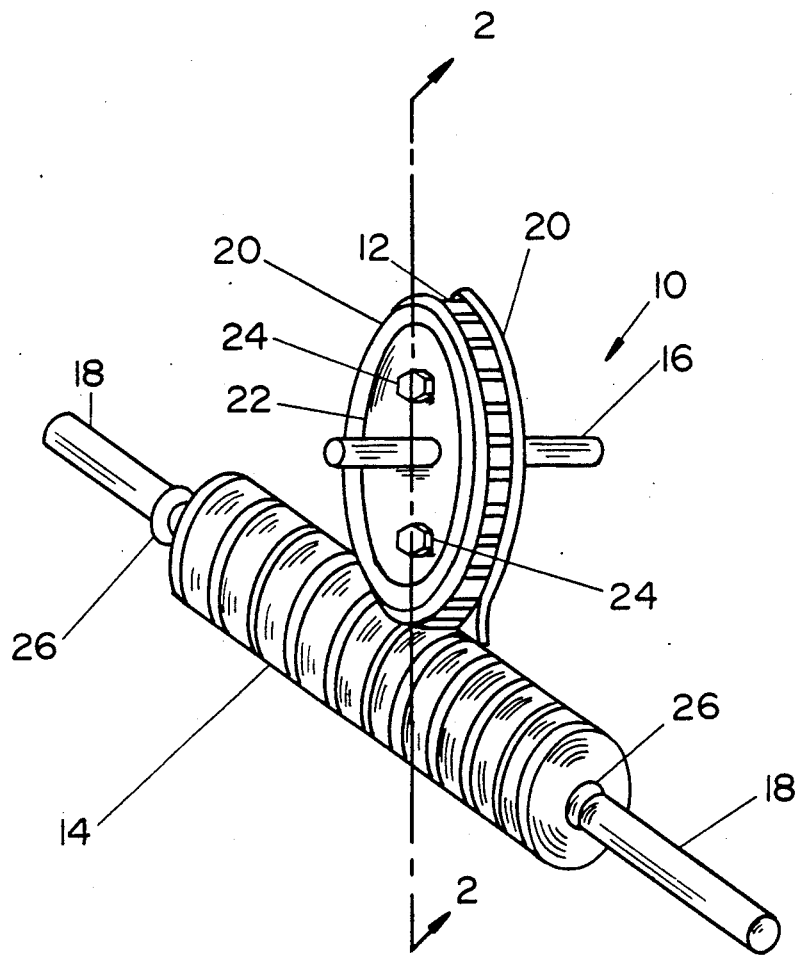
FIG. 1 is a perspective view of the preferred embodiment of the invention.

The preferred embodiment of the invention is shown in FIG. 1 in which gear set 10 is composed of worm gear 12 and worm 14. Worm gear 12 is mounted on shaft 16, which would typically be connected to a load (not shown), and worm 14, which drives worm gear 12, is mounted on shaft 18 which is driven by a power source or another gear set (not shown).

Porous pads 20 are attached to the sides of worm gear 12, and are held in place by washers 22, one of which can not be seen because it is located on the far side of worm gear 12. Washers 22 are clamped against porous pads 20 by bolts 24, which therefore also hold porous pads 20 against worm gear 12.

Porous pads 20 extend far enough toward the perimeter of worm gear 12 so that porous pads 20 are forced to spread apart as they are rotated to approach worm 14. The edges of porous pads 20 therefore contact the highest parts of worm 14 and constantly wipe against worm 14.

It is apparent that the rotation of worm gear 12 continually applies new portions of porous pad 20 to worm 14, while the rotation of worm 14 applies changing portions of worm 14 to the edges of the porous pads.

Therefore, when porous pads 20 are impregnated with lubricating fluid, the fluid is constantly being applied to the tops of the screw thead of worm 14, from which it is distributed to the rest of worm 14 by the rotation of worm 14, and to all the teeth of worm gear 12 by the constantly changing contact between worm 14 and worm gear 12.

One of the improvements furnished by the present invention is the means to prevent the pumping action of spiral worm 14 from distributing the lubricating fluid onto shaft 18 upon which worm 14 rotates. This is accomplished in a surprisingly simple manner by the addition of "O" rings 26 to the structure.

"O" rings 26 are fitted tightly around shaft 18 at locations as close to the ends of worm 14 as is practical, and the configuration of "O" rings prevents the flow of lubricating fluid beyond the location of the "O" rings. With the fluid restricted to the immediate region of worm 14, the lubricating fluid tends to redistribute over worm 14 rather than accumulate on shaft 18 to an extent which would cause the fluid to drip off from shaft 18 and onto other components associated with the apparatus within which gear set 10 is installed.

Figure 2:
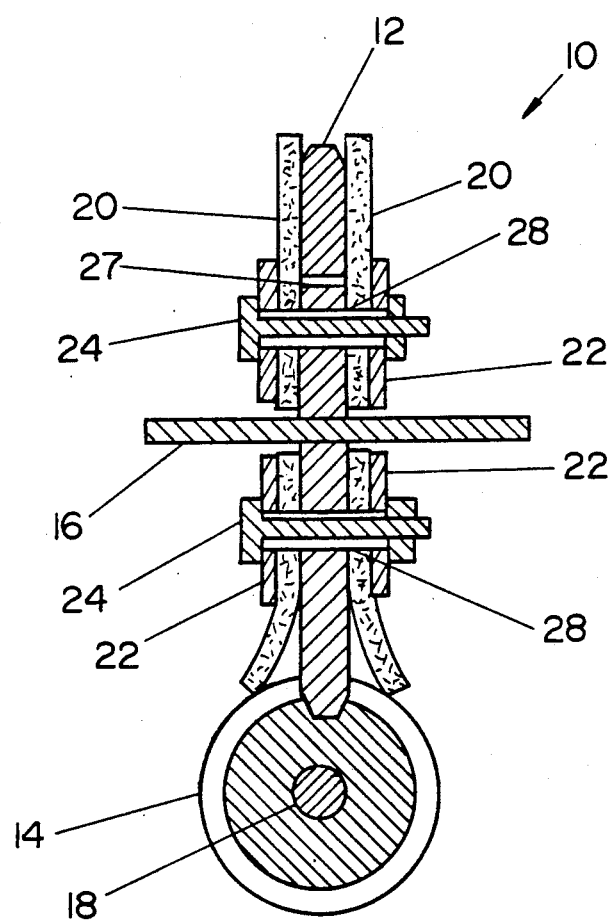
FIG. 2 is a cross section view of the preferred embodiment of the invention taken through the center of the worm gear and the worm shaft.

FIG. 2 is a cross section view of gear set 10 with the cross section taken through shaft 16, a diameter of worm gear 12, and the point at which worm gear 12 and worm 14 meet. FIG. 2 shows the second improvement which the present invention makes available for porous pad lubricating systems. Components common to FIG. 1 and FIG. 2 are identified by the same numerals in both drawings.

The additional feature seen in FIG. 2 is the means for distributing lubricating fluid between the two porous pads 20. This benefit is also attained in a very simple manner, by adding one or more small through holes, such as hole 27, in worm gear 12, with the hole located so that its ends are adjacent to both porous pads 20. The hole's diameter is selected so that it will move the lubricating fluid by capillary action. With that configuration, the hole or holes will transfer fluid from a saturated pad to a drier pad, and will maintain a relatively even distribution of lubricant throughout gear set 10.

FIG. 2 also shows another simple structure which furnishes the capillary pumping action desired for the present invention. Since capillary action is a result of the smallest cross sectional dimension of the hole and not the shape of the hole, it can also be accomplished by merely selecting the proper size for holes 28 through which bolts 24 penetrate worm gear 12. Holes 28 must, of course, have an inside diameter which is dimensioned so that when bolts 24 are inserted within holes 28 the clearance to the side wall of the hole is appropriate to have capillary pumping action for the lubricating fluid being used.

The simplicity of the present invention is clear when the benefits of restricting the flow of lubricating fluid to only the worm gear and the worm and the free interchange of lubricating fluid between the porous pads can be attained by merely placing "O" rings around the shaft of the worm and making certain that the holes for the bolts which hold the porous pads on the worm gear are sized to cause capillary pumping of the lubricating fluid.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, the lubricating fluid barrier located on shaft 18 of worm 14 need not necessarily be an "O" ring nor be constructed of an elastomeric material of which most "O" rings are made. The "O" ring is merely a convenient embodiment, but the barrier could also be any other structure which would overcome the surface tension and other flow inducing properties of the lubricating fluid.

What is claimed as new and for which Letters patent of the United States are desired to be secured is:

1. In a worm gear lubricating apparatus of the type which includes at least one lubricant impregnated porous pad attached to the side of a worm gear with each pad located upon the worm gear so that each porous pad wipes the outside of a worm which rotates on a worm shaft and drives the worm gear, the improvement comprising a barrier means located on the worm shaft in proximity to at least one end of the worm, with the barrier constructed to prevent flow of the lubricant beyond the location of the barrier means.

2. The lubricating apparatus of claim 1 wherein a barrier means is located in proximity to each end of the worm.

3. The lubricating apparatus of claim 1 wherein the barrier means comprises and "O" ring fitted tightly around the worm shaft.

4. In a worm gear lubricating apparatus of the type which includes at least two lubricant impregnated porous pads attached to the sides of a worm gear with each pad located upon the worm gear so that each porous pad wipes the outside of a worm which rotates and drives the worm gear, the improvement comprising a transfer means to move lubricant between the porous pads.

5. The lubricating apparatus of claim 4 wherein the transfer means is at least one through hole in the worm gear to which the porous pads are attached, with each hole having some portion of its defining structure adjacent to each pad of a pair of the porous pads, and each hole size being selected so that the dimensions of the hole create a capillary pumping effect upon the lubricant with which the porous pads are impregnated.

6. The lubricating apparatus of claim 4 wherein the transfer means is at least one through hole into which a retaining bolt fits, with spacing between the bolt and and the side walls of the hole being selected so that the spacing creates a capillary pumping effect upon the lubricant with which the porous pads are impregnated.

* * * * *